United States Patent
Vassilieva et al.

(10) Patent No.: US 9,967,054 B2
(45) Date of Patent: May 8, 2018

(54) OPTIMIZATION OF NETWORKS CARRYING SUPERCHANNELS WITH DIFFERENT MODULATION FORMATS

(71) Applicant: Fujitsu Limited, Kawasaki-shi, Kanagawa (JP)

(72) Inventors: Olga Vassilieva, Plano, TX (US); Inwoong Kim, Allen, TX (US); Tadashi Ikeuchi, Plano, TX (US)

(73) Assignee: Fujitsu Limited, Kawasaki (JP)

(*) Notice: Subject to any disclaimer, the term of this patent is extended or adjusted under 35 U.S.C. 154(b) by 0 days. days.

(21) Appl. No.: 15/388,849

(22) Filed: Dec. 22, 2016

(65) Prior Publication Data

US 2017/0346594 A1 Nov. 30, 2017

Related U.S. Application Data

(60) Provisional application No. 62/340,696, filed on May 24, 2016.

(51) Int. Cl.
| | |
|---|---|
| H04B 10/04 | (2006.01) |
| H04J 14/00 | (2006.01) |
| H04J 4/00 | (2006.01) |
| H04J 14/02 | (2006.01) |
| H04B 10/516 | (2013.01) |

(52) U.S. Cl.
CPC ........ *H04J 14/0267* (2013.01); *H04B 10/516* (2013.01); *H04J 14/0212* (2013.01); *H04J 14/0213* (2013.01); *H04J 14/0224* (2013.01); *H04J 14/0221* (2013.01)

(58) Field of Classification Search
None
See application file for complete search history.

(56) References Cited

U.S. PATENT DOCUMENTS

| | | | | |
|---|---|---|---|---|
| 2012/0269506 | A1* | 10/2012 | Vassilieva | H04J 14/0221 398/26 |
| 2013/0011138 | A1* | 1/2013 | Kim | H04B 10/616 398/79 |

(Continued)

OTHER PUBLICATIONS

Vassilieva, Olga, et al. "Optimization of networks carrying superchannels with different modulation formats for maximum spectral efficiency and reach." OptoElectronics and Communications Conference (OECC) held jointly with 2016 International Conference on Photonics in Switching (PS), 2016 21st. IEEE, 2016; 3 pages.

(Continued)

*Primary Examiner* — Ken N Vanderpuye
*Assistant Examiner* — Jai Lee
(74) *Attorney, Agent, or Firm* — Baker Botts L.L.P.

(57) ABSTRACT

Methods and systems for optimizing the transmission of superchannels with different modulation formats may include pre-calculating different guardband (GB) values between superchannels and sets of power values for subcarriers to implement subcarrier power pre-emphasis (SPP). When a request for an optical path is received at a network management system, the spectral allocation of each superchannel, including a GB, is determined according to pre-specified rules based on co-propagation of the superchannels with different modulation formats.

16 Claims, 6 Drawing Sheets

(56) References Cited

U.S. PATENT DOCUMENTS

| | | | | |
|---|---|---|---|---|
| 2013/0336658 A1* | 12/2013 | Xia | .................... | H04J 14/0204 |
| | | | | 398/83 |
| 2014/0022699 A1* | 1/2014 | Wakaki | .................. | H01G 4/105 |
| | | | | 361/321.3 |
| 2014/0226993 A1* | 8/2014 | Jansen | .................. | H04B 10/505 |
| | | | | 398/182 |
| 2014/0314416 A1* | 10/2014 | Vassilieva | ................ | H04B 3/32 |
| | | | | 398/76 |
| 2015/0222360 A1* | 8/2015 | Boertjes | ........... | H04B 10/25073 |
| | | | | 398/141 |
| 2015/0333824 A1* | 11/2015 | Swinkels | ............ | H04J 14/0227 |
| | | | | 398/25 |
| 2016/0105252 A1* | 4/2016 | Bouda | .................. | H04J 14/0224 |
| | | | | 398/49 |
| 2016/0261343 A1* | 9/2016 | Akasaka | .......... | H04B 10/25073 |
| 2016/0315712 A1* | 10/2016 | Vassilieva | ............ | H04B 10/564 |

OTHER PUBLICATIONS

Vassilieva, Olga, et al. "Flexible grid network optimization for maximum spectral efficiency and reach", Proc. ECOC, Tu.1.4.2, Valencia (2015); 3 pages.

\* cited by examiner

OPTIMIZATION OF NETWORKS CARRYING SUPERCHANNELS WITH DIFFERENT MODULATION FORMATS

CROSS-REFERENCE TO RELATED APPLICATIONS

This application claims priority from U.S. Provisional Application No. 62/340,696 filed May 24, 2016, entitled "OPTIMIZATION OF NETWORKS CARRYING SUPERCHANNELS WITH DIFFERENT MODULATION FORMATS".

BACKGROUND

Field of the Disclosure

The present disclosure relates generally to optical communication networks and, more particularly, to optimization of networks carrying superchannels with different modulation formats.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency.

SUMMARY

In one aspect, a disclosed method is for transmitting superchannels with different modulation formats. The method may include identifying a first optical path and a second optical path over an optical network. In the method, a first superchannel in a first modulation format may be transmitted over the first optical path and a second superchannel in a second modulation format may be transmitted over the second optical path. In the method, the first optical path and the second optical path may share at least two network nodes, such that the first optical path and the second optical path are a common optical path over a distance Y. The method may also include retrieving a guardband (GB) value from a database for the first superchannel being co-propagated with the second superchannel over the common optical path, and retrieving a first set of optical power values from the database for the first superchannel and a second set of optical power values for the second superchannel. In the method, the first set of optical power values and the second set of optical power values may specify optical power for each subcarrier, respectively, in the first superchannel and the second superchannel to implement superchannel power pre-emphasis (SPP). The method may further include configuring a first launch power for the first superchannel over the first optical path according to the first set of power values, and configuring a second launch power for the second superchannel over the second optical path according to the second set of power values. Based on predetermined rules for the first optical path and the second optical path, the method may further include applying either zero GB or the GB value between the first superchannel and the second superchannel over the distance Y for the common optical path.

In any of the disclosed embodiments, the method may further include pre-calculating the GB value for different types of superchannels, respectively, and storing the GB values in the database, and pre-calculating a set of power values corresponding to each subcarrier for different superchannels, respectively, and storing the sets of power values in the database. In the method, the GB values and the sets of power values may be indexed in the database for different modulation formats, different numbers of subcarriers, and different values for the distance Y.

In any of the disclosed embodiments of the method, the first modulation format may be a lower order modulation format having a greater propagation distance than the second modulation format, which may be a higher order modulation format. In the method, the first modulation format may be a QPSK format, and the second modulation format may be an m-QAM format where m is greater than 4.

In any of the disclosed embodiments of the method, the first modulation format and the second modulation format may be dual-polarization (DP) modulation formats.

In any of the disclosed embodiments of the method, the predetermined rules may specify, when the first optical path and the second optical path co-propagate at a begin or an end of at least one of the first optical path and the second optical path, setting a GB between the first superchannel and the second superchannel to zero when the distance Y is less than a threshold distance, and setting the GB to the GB value when the distance Y is greater than or equal to the threshold distance. In the method, the threshold distance may be 900 km.

In any of the disclosed embodiments of the method, the predetermined rules may further specify, when the first optical path and the second optical path do not co-propagate at a begin or an end of at least one of the first optical path and the second optical path, where the second optical path spans the distance Y, and the first optical path spans a distance X that is greater than the distance Y, setting a GB between the first superchannel and the second superchannel to zero when the second optical path starts at less than a distance Z from the begin of the first optical path, the distance Z given by $(X-Y)/2$, and setting the GB to the GB value when the second optical path starts greater than or equal to the distance Z from the begin of the first optical path.

Additional disclosed aspects include a network management system for enabling transmission of superchannels with different modulation formats, the network management system comprising a processor configured to access non-transitory computer readable memory media storing instructions executable by the processor. In one embodiment, the instructions may be executable by the process to implement the method in the previous aspect.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Figure 1:
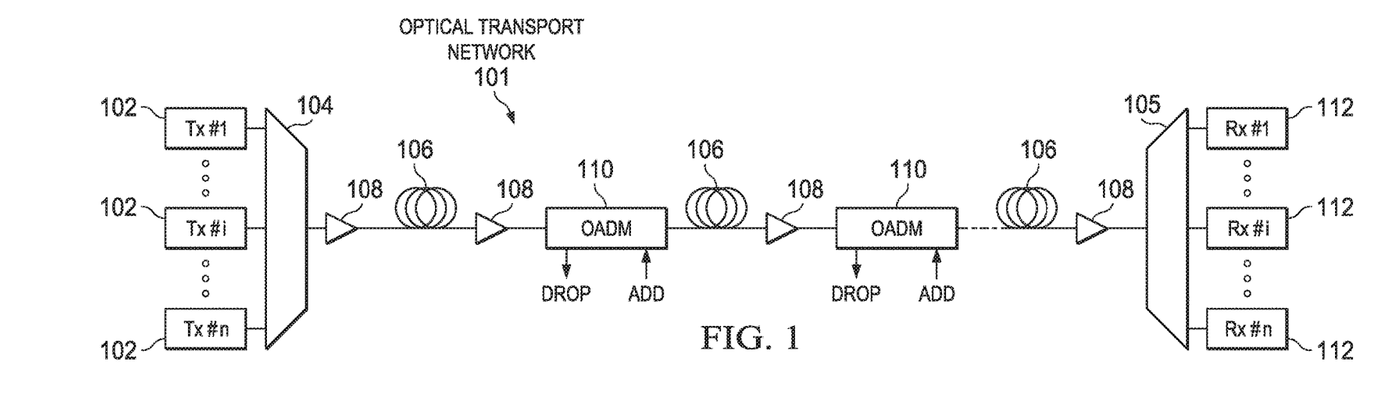
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm spacing and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Advancements in DWDM enable combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. In a superchannel, a plurality of subcarriers (or subchannels or channels) are densely packed in a fixed bandwidth band and may be transmitted at very high data rates. Furthermore, the superchannel may be well suited for transmission over very long distances, such as hundreds of kilometers, for example. A typical superchannel may comprise a set of subcarriers that are frequency multiplexed to form a single channel that are transmitted through an optical transport network as one entity. The subcarriers within the superchannel may be tightly packed to achieve high spectral efficiency.

In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate (see also FIG. 2).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and π) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

Optical networks, such as optical transport network 101, are being developed as flexible and adaptive networks with variable modulation format, data rate and channel spacing to satisfy high capacity demands. The universal transceivers of such optical networks may provide adaptive modulation for improved utilization of capacity and reach. Further, flexible grid optical networks may deliver more efficient use of the optical bandwidth, whose gains strongly rely on the order of modulation format and spacing between channels. To increase optical network capacity even further, superchannels may be deployed. However, nonlinear interactions between tightly spaced subcarriers can limit transmission reach of certain superchannels.

For example, center subcarriers in a superchannel may experience larger OSNR penalties compared to edge subcarriers. Subcarrier power pre-emphasis (SPP) techniques may be used to equalize performance of all the subcarriers and extend the reach of center subcarriers. In addition, when multiple superchannels of the same modulation format are transmitted through the network, the performance of all subcarriers may be affected by the neighboring channels and the guard band (GB) between them. Using optimum SPP together with small GB of 12.5 GHz, the maximum SE-reach performance of optical networks carrying uniform traffic with DP-16QAM and DP-QPSK superchannels may be improved.

However, in order to maximize network capacity, the superchannels with different modulation formats and data rates will propagate side-by-side throughout a network.

Thus, these superchannels may experience different nonlinear (NL) interactions with each other. Therefore, the range of NL interactions between superchannels of various configurations should be understood and, subsequently, such networks should be optimized for their mutual benefit. In this disclosure, the experimentally confirmed physical layer optimization procedure of prior work (see O. Vassilieva et al., "Flexible grid network optimization for maximum spectral efficiency and reach", Proc. ECOC, Tu.1.4.2, Valencia (2015)) is applied to flexible grid network deploying a mix of 1 Tb/s, 5 subcarrier, DP-16QAM modulated superchannels and 400 Gb/s, 4 subcarrier, DP-QPSK modulated superchannels. It is shown that due to different NL interactions between co-propagating superchannels, a GB can effectively extend a reach L of DP-16QAM superchannels, while the GB may be omitted for DP-QPSK superchannels. It is also shown that SPP in combination with the small GB may maximize SE performance and reach L of each superchannel.

As will be described in further detail herein, methods and systems are disclosed for optimization of optical networks, such as optical transport network 101, carrying superchannels with different modulation formats.

Figure 2:
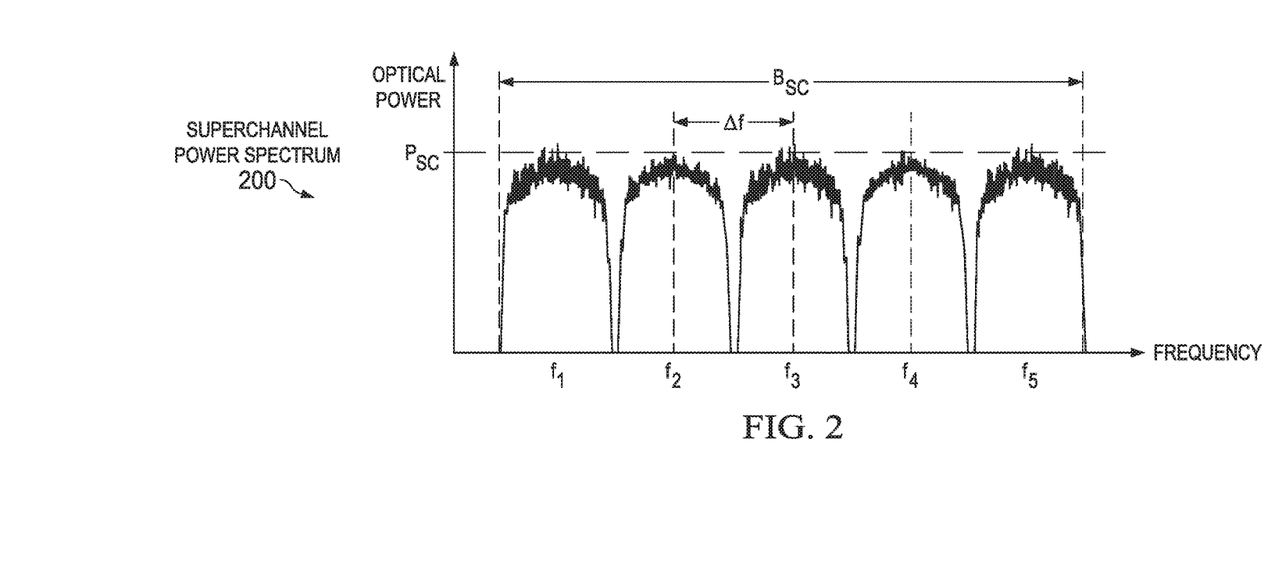
FIG. 2 shows selected elements of an embodiment of a superchannel power spectrum.

Referring to FIG. 2, selected elements of an embodiment of a superchannel is shown as superchannel power spectrum 200, which depicts five (5) subcarriers. While the data used for superchannel power spectrum 200 are not actual measured values, the illustrated power spectrum may be characteristic of an actual superchannel. In superchannel power spectrum 200, the subcarriers may each be modulated with 200 GB/s DP-16-QAM signals. Furthermore, each subcarrier band has been subject to electrical Nyquist pulse shaping in the transmitter using a root raised cosine method using a roll-off factor of 0.15. As shown in FIG. 2, $B_{SC}$ represents the fixed superchannel transmission band, while $\Delta f$ represents the subcarrier frequency spacing. In certain embodiments, the subcarrier frequency spacing $\Delta f$ may be 35 GHz and may be uniform between each center frequency $f_1$, $f_2$, $f_3$, $f_4$, and $f_5$, respectively corresponding to the subcarriers. The subcarrier frequency spacing $\Delta f$ may be selected to be wide enough to prevent any significant linear crosstalk between adjacent subcarriers. The optical signal of each subcarrier may be multiplexed using an optical coupler to form the single superchannel in the fixed transmission band $B_{SC}$ having an aggregate data rate of 1 Tb/s, for example. It is noted that different values for the fixed superchannel transmission band, $B_{SC}$, the subcarrier frequency spacing $\Delta f$, and the overall aggregate data rate may result in superchannel power spectrum 200. Also shown in FIG. 2 is constant power level, $P_{SC}$, that is a power level for the superchannel that is substantially similar or equal for each of the 5 subcarriers, such that $P_{SC}$, may correspond to an average power level for each of the subcarriers.

In typical DWDM networks, it is known that system performance may depend on an allocation of each wavelength channel on the wavelength grid, such that a longer wavelength channel may suffer from smaller nonlinear impairments compared to a shorter wavelength channel. In case of superchannel-based WDM systems, in addition to the wavelength dependency of the subcarrier error rate across the transmission band, such as the C-band, a dependency of individual subcarrier error rate (or OSNR at the receiver) on spectral allocation of the subcarrier within the superchannel has now been observed in the form of nonlinear impairments (such as cross-talk). Linear cross-talk may be observed between two adjacent subcarriers (inter-subcarrier) and may depend on a degree or extent of overlap in the frequency domain of the adjacent subcarriers. The use of Nyquist pulse shaping, as shown in FIG. 2, may represent an effective means for maintaining a minimum level of linear cross-talk between adjacent subcarriers, at least in part due to the nearly vertical edges of the Nyquist-shaped subcarriers (spectral pulses) that do not substantially overlap each other in the frequency domain. Nonlinear cross-talk may also be observed and may arise from nonlinear interactions during fiber transmission.

The nonlinear interactions may include phenomena such as cross-phase modulation (XPM), self-phase modulation (SPM), and four-wave mixing, among others. Cross-phase modulation may occur when phase information, amplitude information, or both from one channel is modulated to an adjacent channel in the superchannel. Self-phase modulation may arise when a variation in the refractive index (or a dependency of the refractive index on intensity) results in a phase shift within each subcarrier. In four-wave mixing, three wavelengths may interact to create a fourth wavelength that may coincide with a wavelength of a subcarrier, and may lead to undesirable variations in peak power or other types of signal distortion on the affected subcarrier. Furthermore, nonlinear cross-talk may comprise inter-subcarrier components. Since nonlinear interactions occur during fiber transmission and may not depend on a degree of overlap of the subcarrier frequency bands, Nyquist pulse shaping may be ineffective in resolving certain problems with nonlinear cross-talk in a superchannel.

Figure 3:
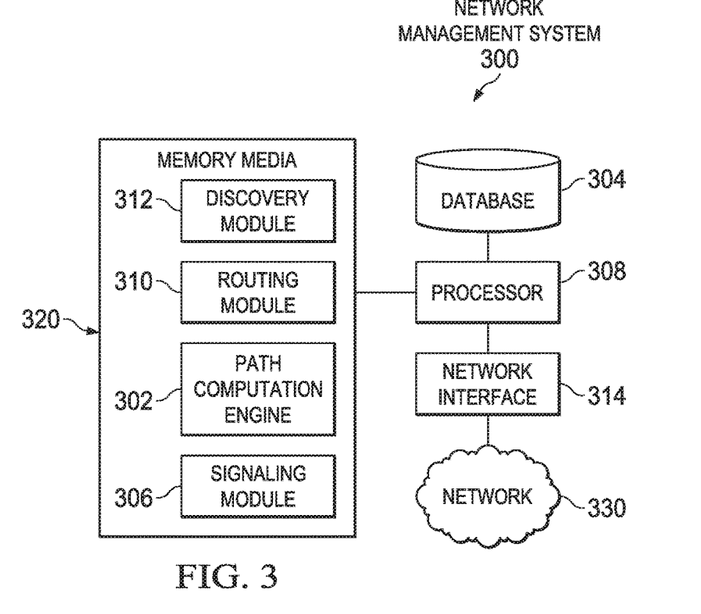
FIG. 3 is a block diagram of selected elements of an embodiment of an optical control plane system for superchannel subcarrier monitoring.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory;

non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. Network 330 may also include certain portions of a network using galvanic or electronic media. In certain embodiments, network 330 may include at least certain portions of a public network, such as the Internet. Network 330 may be implemented using hardware, software, or various combinations thereof.

In certain embodiments, network management system 300 may be configured to interface with a person (a user) and receive data about the optical signal transmission path. For example, network management system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, network management system 300 may be configured to receive data about the optical signal transmission path from a device such as another computing device or a network element, for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in an optical network, such as optical transport network 101. For example, when an ingress node in the optical network receives a service request, network management system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

Figure 12:
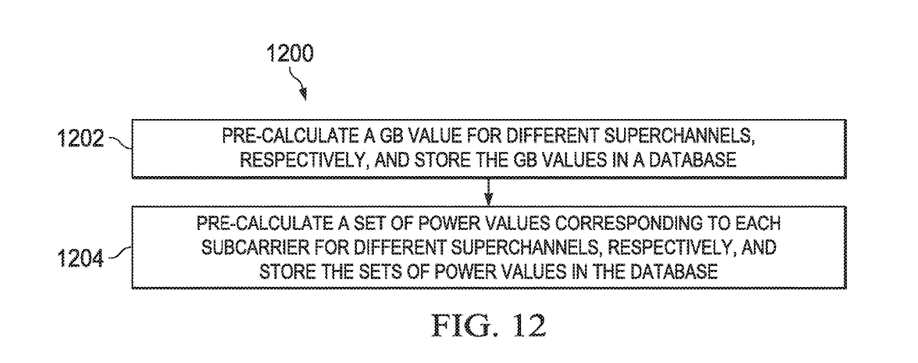
FIG. 12 is a flow chart of selected elements of a method for optimizing transmission of superchannels with different modulation formats.

In operation of network management system 300, a spectral amount of GB and an amount of optical power adjustment for SPP for each subcarrier may be pre-calculated and stored in database 304 for various combinations of modulation formats, numbers of subcarriers, and co-propagation distances (see also FIG. 12). Then, a network path may be provisioned in the optical network for a specific superchannel configuration, for example, in response to a customer request for network services. Then, the optical modulation format for the specific superchannel configuration may be determined. Finally, the spectral bandwidth, including any applicable GB, may be determined by specific rules, described in further detail below, for each modulation format and co-propagation schemes that arise. In this manner, the SE and reach L for each superchannel may be optimized in the optical network.

Figure 4:
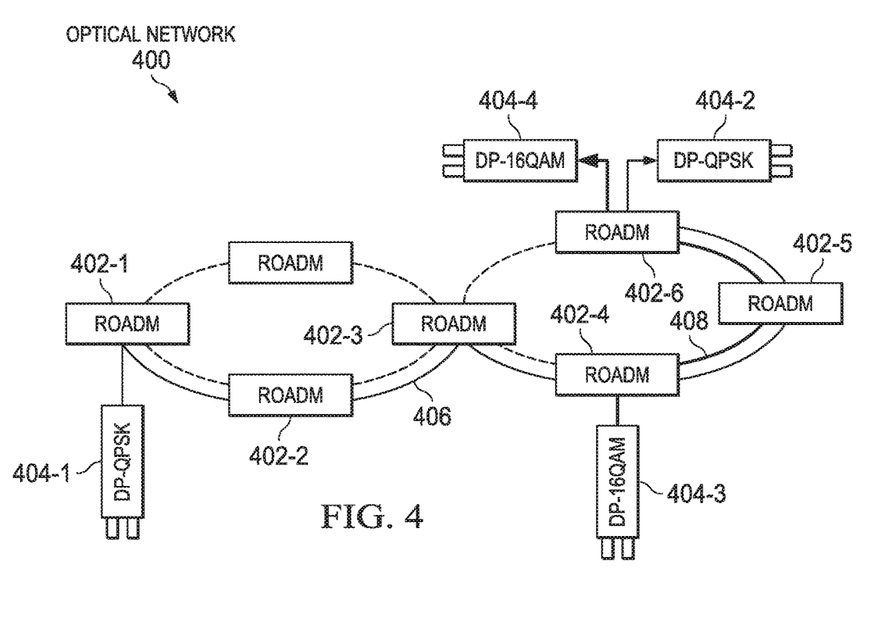
FIG. 4 is a block diagram of selected elements of an embodiment of an optical network with universal transceivers and ROADMs.

Referring now to FIG. 4, selected elements of an embodiment of an optical network 400 with universal transceivers 404 and ROADMs 402 is shown. Network 400 is shown in an exemplary embodiment to show how the range of nonlinear interactions between superchannels of various configurations is determined. In FIG. 4, universal transceivers 404 may be programmed or reconfigured to apply a given modulation format to a superchannel. FIG. 4 is a schematic representation and is not drawn to scale or perspective. In FIG. 4, universal transceivers 404-1, 404-2 are shown transmitting a DP-QPSK superchannel along a first optical path 406 that spans over ROADMs 402-1, 402-2, 402-3, 402-4, 402-5, and 402-6, while universal transceivers 404-3, 404-4 are shown transmitting a DP-16QAM superchannel along a second optical path 408 that spans over ROADMs 402-4, 402-5, and 402-6.

Universal transceiver 404 can be programmed to transmit DP-QPSK superchannels over longer distances and higher spectrally efficient DP-16QAM superchannels over shorter distances. Lower order modulation formats, such as DP-QPSK have higher OSNR tolerance and, thus, can travel over longer distances (reach L), while higher order modulation formats, such as DP-16QAM, have lower OSNR tolerance and, thus, can traverse shorter distances. When such superchannels co-propagate through optical network 400, the performance of all subcarriers within the superchannels may strongly depend on the type of the co-propagating channels and the GB between co-propagating superchannels. For example, at ROADM 402-5, both superchannels co-propagate. The channels with different modulation formats can impose different inter- and intra-superchannel nonlinearity. The larger GB between superchannels can effectively reduce inter-superchannel nonlinear noise and the impact of passband narrowing (PBN), while the smaller GB is highly desirable to keep optical network 400 at high capacity levels by more efficiently utilizing the available optical spectrum. The intra-superchannel NL, on the other hand, may depend on the number of subcarriers and may impose larger OSNR penalties on center subcarriers when all subcarriers are launched with equal power.

In FIG. 4, the DP-16QAM optical signal co-propagates with the DP-QPSK optical signal at the end of an optical path that terminates at ROADM 402-6. The DP-16QAM optical signal is added at ROADM 402-4, when the DP-QPSK optical signal has already been propagated over long distance. In such a co-propagation case, the nonlinear (NL) impact of the DP-QPSK optical signal on the DP-16QAM optical signal is large, because nonlinearity accumulates with distance. Large accumulated nonlinearity in the DP-QPSK optical signal may be manifested as a large signal peak power and, correspondingly, in a large peak-to-average-power ratio (PAPR) variation, which, in turn, may cause increased phase noise on the DP-16QAM optical signal. Thus, the co-propagation case shown in optical network 400 results in more severe NL impact and a guardband GB=12.5 GHz may be indicated. However, when both the DP-QPSK optical signal and the DP-16QAM optical signal co-propagate together at the beginning of their optical path (both enter the common optical path from the same node or from the next few neighboring nodes), then the accumulated nonlinearity is reduced. In this case of initial co-propagation, a guardband GB=0 GHz may be used because of the small mutual interference (see also step 1312 in FIG. 13 below).

Figure 5:
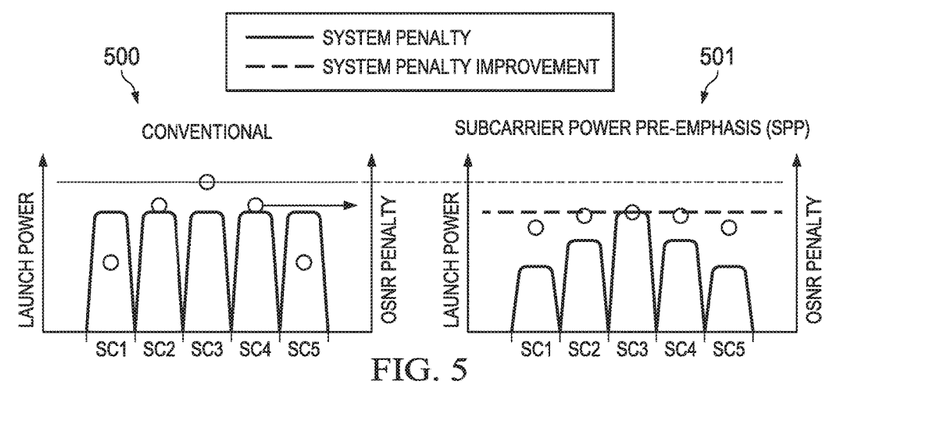
FIGS. 5, 6, and 7 show plots of superchannel power spectra.

FIG. 5 shows plots 500, 501 of superchannel power spectra, such as for 5-subcarrier superchannels transmitted over optical network 400 (see FIG. 4). In plot 500, a relatively large OSNR penalty from intra-channel nonlinear noise is observed for center subcarriers SC2, SC3, SC4 when the launch power is equivalent for all subcarriers, SC1, SC2, SC3, SC4, and SC5. In plot 501, the SPP technique is shown, in which the launch power of the edge subcarriers is modified such that the edge subcarriers are launched at lower power levels compared to the center subcarriers. In comparison to plot 500, plot 501 shows an improvement in the OSNR penalty when SPP is applied, which is desirable. The SPP technique shown in plot 501 has been experimentally validated to reduce OSNR penalties and equalize overall performance of all subcarriers. Therefore, it has been determined that careful optimization of the GB and SPP can minimize both intra- and inter-superchannel nonlinear noise, PBN and deliver the optimum performance in terms of the SE and reach L.

Figure 6:
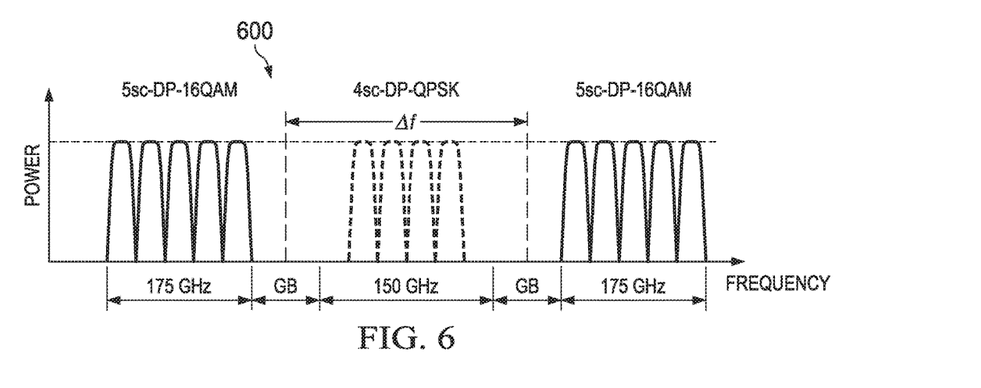
Figure 7:
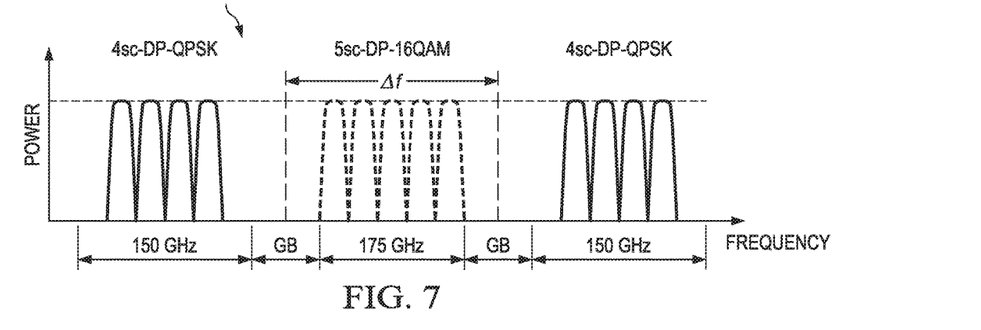

FIGS. 6 and 7 show respectively spectra 600 and spectra 700 illustrating two exemplary configurations of superchannel transmission. In this disclosure, the transmission of 400 Gb/s, 4 subcarrier, DP-QPSK modulated superchannels and 1 Tb/s, 5 subcarrier, DP-16QAM modulated superchannels are analyzed with respect to their mutual interference as a function of the GB. Then, the GB and SPP are determined to optimize the optical network performance in terms of maximum SE and reach L. For this purpose, spectra 500 and spectra 600 are shown as two exemplary configurations. In spectra 600, the 400 Gb/s, 4 subcarrier, DP-QPSK modulated superchannel is shown spectrally surrounded by two 1 Tb/s, 5 subcarrier, DP-16QAM modulated superchannels. In spectra 700, a 1 Tb/s, 5 subcarrier, DP-16QAM modulated superchannel is spectrally surrounded by two 400 Gb/s, 4 subcarrier, DP-QPSK modulated superchannels. A fixed superchannel transmission band (see $B_{SC}$ in FIG. 2) for the DP-16QAM modulated superchannel is set to 175 GHz and the fixed superchannel transmission band for the DP-QPSK modulated superchannel is to 150 GHz (corresponding to 140 GHz superchannel transmission band plus 5 GHz of unused GB on each side of the spectrum to fit into the ITU-T DWDM frequency grid specification). The superchannels may be spaced with an additional variable GB ranging from 0 GHz to 87.5 GHz. Each subcarrier in both the exemplary configurations shown in spectra 600 and 700 is modulated at 32 Gbaud, Nyquist pulse shaped with a root raised cosine filter with 0.15 roll-off factor and spaced with 35 GHz. Then, the superchannels corresponding to spectra 600 and 700 were each transmitted over 15 spans×60 km (900 km total) comprising SMF fiber with uncompensated dispersion.

In FIG. 6, the fiber input power (launch power) of each subcarrier of spectra 600 without SPP was set to 0 dBm/subcarrier for DP-16QAM and 4 dBm/subcarrier for DP-QPSK. The higher fiber input power of DP-QPSK reflects its higher OSNR and NL tolerance compared to DP-16QAM. Thus, under this scenario, the transmission reach of the DP-QPSK superchannel can be assumed to be approximately 2.5 times longer than the DP-16QAM superchannels, which is 2250 km (2.5×900 km), at fiber input power 0 dBm/subcarrier. This condition helps to estimate NL impact of the shorter traveling DP-16QAM superchannel on longer traveling DP-QPSK superchannels.

In FIG. 7, the fiber input power of all subcarriers of spectra 700 was set to 0 dBm/subcarrier, which was used to evaluate NL impact of DP-QPSK superchannels on DP-16QAM during their co-propagation over a shorter reach (900 km). In addition, each superchannel was transmitted through 4 ROADM nodes with an 8.5-th order Gaussian filter and 3 dB bandwidth (BW) as wide as the superchannel transmission band plus GB to account for PBN impact on the edge subcarriers. At the end of the transmission line, the performance of each subcarrier was evaluated with a coherent receiver by tuning a local oscillator frequency to a specific subcarrier and using DSP processing.

Figure 8:
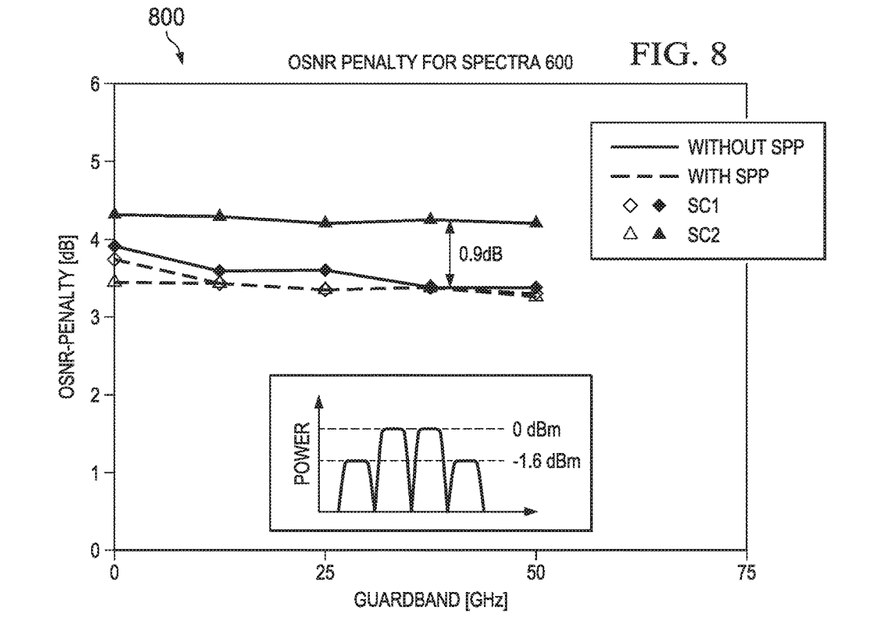
FIGS. 8 and 9 show plots of OSNR penalties versus GB for different superchannel power spectra.
Figure 9:
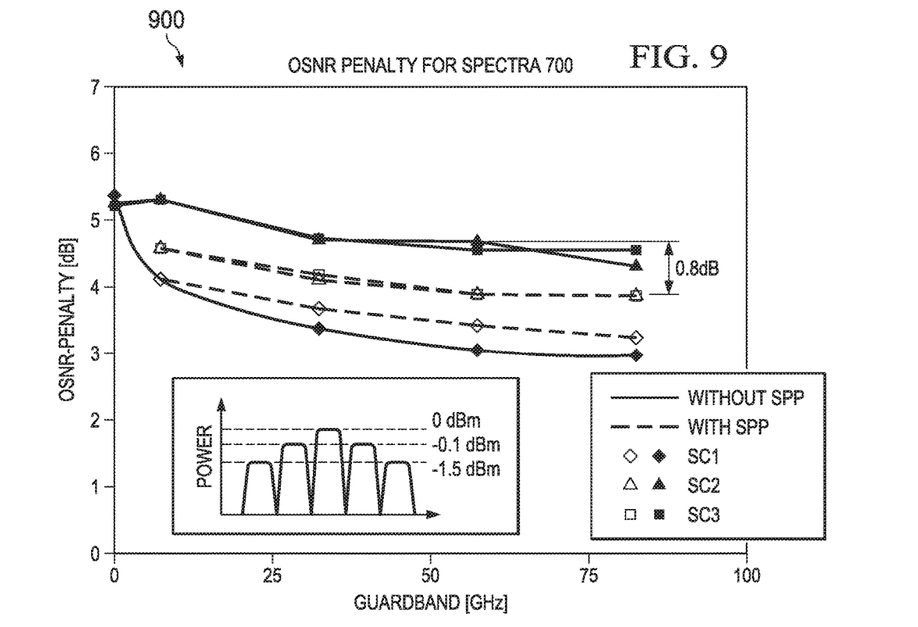

FIG. 8 depicts plot 800 showing OSNR penalties, received at a bit error rate (BER)=$10^{-3}$ for spectra 600 as transmitted in optical network 400 (see FIG. 4). FIG. 9 depicts plot 900 showing OSNR penalties, received at a bit error rate (BER)=$10^{-3}$ for spectra 700 as transmitted in optical network 400. The edge subcarriers of the 4 subcarrier-DP-QPSK superchannel in spectra 600 shown in plot 800 are less affected by PBN than the edge subcarriers of the 5 subcarrier-DP-16QAM superchannel in spectra 700 shown in plot 800 when GB=0 GHz. In addition, the DP-16QAM modulation causes negligible inter-superchannel NL penalty on the DP-QPSK modulation of spectra 600, resulting in no OSNR penalty improvement due to larger GB. The NL impact of the DP-QPSK superchannel on the DP-16QAM superchannel of spectra 700, on the other hand, can be reduced with larger GB. In addition, the difference in performance between center and edge subcarriers in both spectra 600 and 700 due to large intra-superchannel NL can be seen.

Further in FIGS. 8 and 9, respectively, the power variation among subcarriers when SPP is applied to spectra 600 and 700 is shown in an inset-plot in each of plots 800 and 900. With SPP (shown as dotted lines), the optimum power per subcarrier shown in the inset plots may contribute an additional 0.8 to 0.9 dB of OSNR improvement and may equalize performance of all subcarriers. Thus, carefully optimized GB and SPP can extend the reach of both configurations in spectra 600 and 700.

Figure 10:
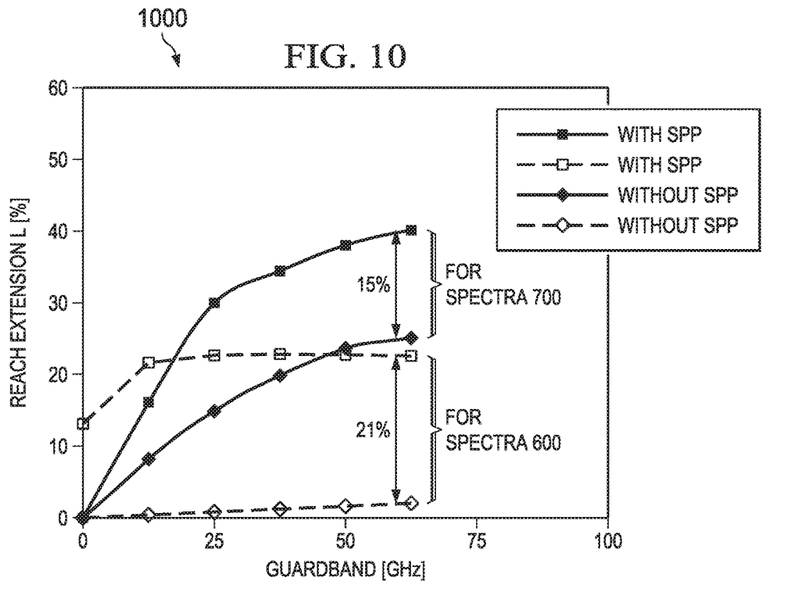
FIG. 10 shows a plot of reach L extension versus GB for different superchannel power spectra.

FIG. 10 shows a plot 1000 depicting the reach extension L in % with SPP and without SPP for spectra 600 and 700 as transmitted in optical network 400 (see FIG. 4). Even without a GB, reach extension is observed for spectra 600, while a larger GB may bring up to 25% reach extension for spectra 700. Plot 1000 demonstrates that SPP is effective for both spectra 600 and 700 and may further extend reach by additional 21% for spectra 600 and 15% for spectra 700. Plot 1000 may be used as a guideline for the choice of a particular GB for a desired maximum system reach, assuming that the optical network is not capacity-constrained.

Figure 11:
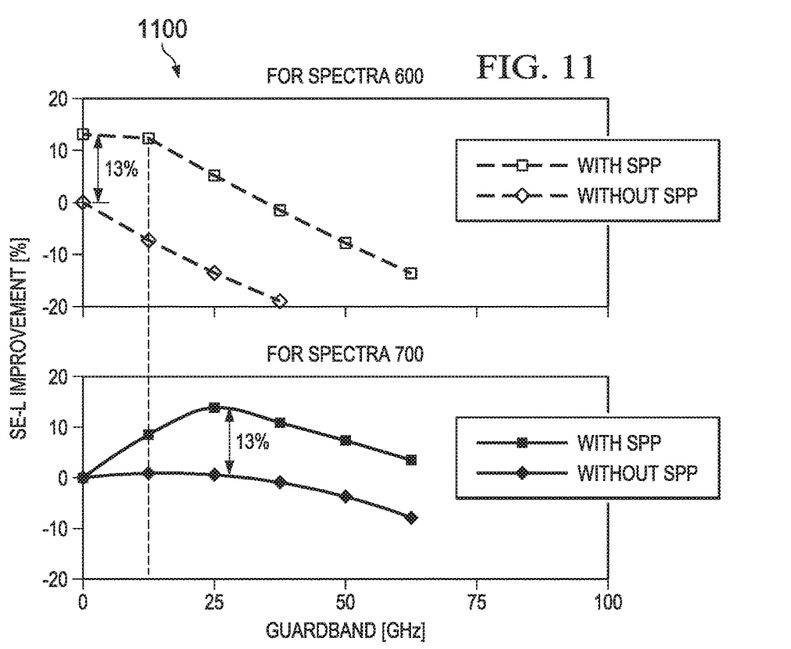
FIG. 11 shows a plot of SE-L improvement versus GB for different superchannel power spectra.

FIG. 11 shows a plot 1100 of SE-L improvement versus GB with and without SPP for spectra 600 and 700 as transmitted in optical network 400 (see FIG. 4), depicting how capacity-constrained optical networks may be optimized for maximum SE-L performance. For plot 1100, SE is defined as SE=2×M× N×SR/Δf, where 2 is the number of polarizations, M is the number of bits per symbol in the constellation, N is the number of subcarriers in superchannel, SR is the symbol rate and Δf is a transmission band for the superchannel, including GB. The definitions of the GB and the BW Δf of each superchannel are shown in spectra 600 and 700 in FIGS. 6 and 7, respectively.

In FIG. 11, plot 1100 demonstrates that SPP alone may improve the SE-L product by 13% for spectra 600, while SPP in combination with 25 GHz GB can improve maximum SE-L performance by 13% for spectra 700. Accordingly, plot 1100 indicates that applying the GB alone may not be sufficient to optimize the optical network for both spectra 600 and 700. However, considering the entire optical network, deploying a mix of the DP-16QAM and DP-QPSK superchannels, the combination of SPP and GB=12.5 GHz may deliver the maximum SE-L performance of each superchannel (shown as a vertical black dotted line at 12.5 GHz GB). Thus, the combination of SPP and GB=12.5 GHz may provide mutual benefit to both spectra 600 and 700.

As described above with respect to FIGS. 6-11, optimization of dynamic and flexible grid optical networks deploying a mix of 1 Tb/s 5sc-DP-16QAM and 400 Gb/s 4sc-DP-QPSK superchannels is numerically investigated. The combination of the SPP and GB is used to optimize the network for maximum reach L or maximum SE-L product. It is shown that GB can extend the reach of DP-16QAM superchannels by 25% due to a smaller impact from co-propagating DP-QPSK superchannels. It is also shown that a GB may be omitted for DP-QPSK superchannels surrounded with DP-16QAM superchannels. It is shown that SPP can extend the reach even further for both types of superchannels. Moreover, it is also demonstrated that utilization of GB alone may not be enough for reaching the maximum SE-L product, which may be attained using a combination of SPP and a small GB of 12.5 GHz (only one frequency slot), which may maximize the SE-L product for mutual benefit of both types of superchannels.

Referring now to FIG. 12, a flowchart of selected elements of an embodiment of method 1200 for optimizing transmission of superchannels with different modulation formats, as described herein, is depicted. Method 1200 may be performed using optical transport network 101 by network management system 300, which may communicate with various components in optical transport network 101, as described above. It is noted that certain operations described in method 1200 may be optional or may be rearranged in different embodiments. Method 1200 describes pre-calculation operations that may be performed in advance of method 1300 (see FIG. 13) to generate reference values that are stored an indexed in a database, such as database 304, and which may later be retrieved in method 1300.

Method 1200 may begin at step 1202 by pre-calculating a guardband (GB) value for different superchannels, respectively, and store the GB values in a database. At step 1204, a set of power values corresponding to each subcarrier is pre-calculated for different superchannels, respectively, and the sets of power values are stored in the database. It is noted that the GB values and the sets of power values may be indexed in the database for different modulation formats, different numbers of subcarriers, and different values for the distance Y, among other indexing criteria. In this manner, for example, network management system 300 may retrieve the GB values and the sets of power values corresponding to any particular request for a superchannel co-propagating over an optical path with another superchannel having a different modulation format, based on properties of the optical path and both of the superchannels.

Figure 13:
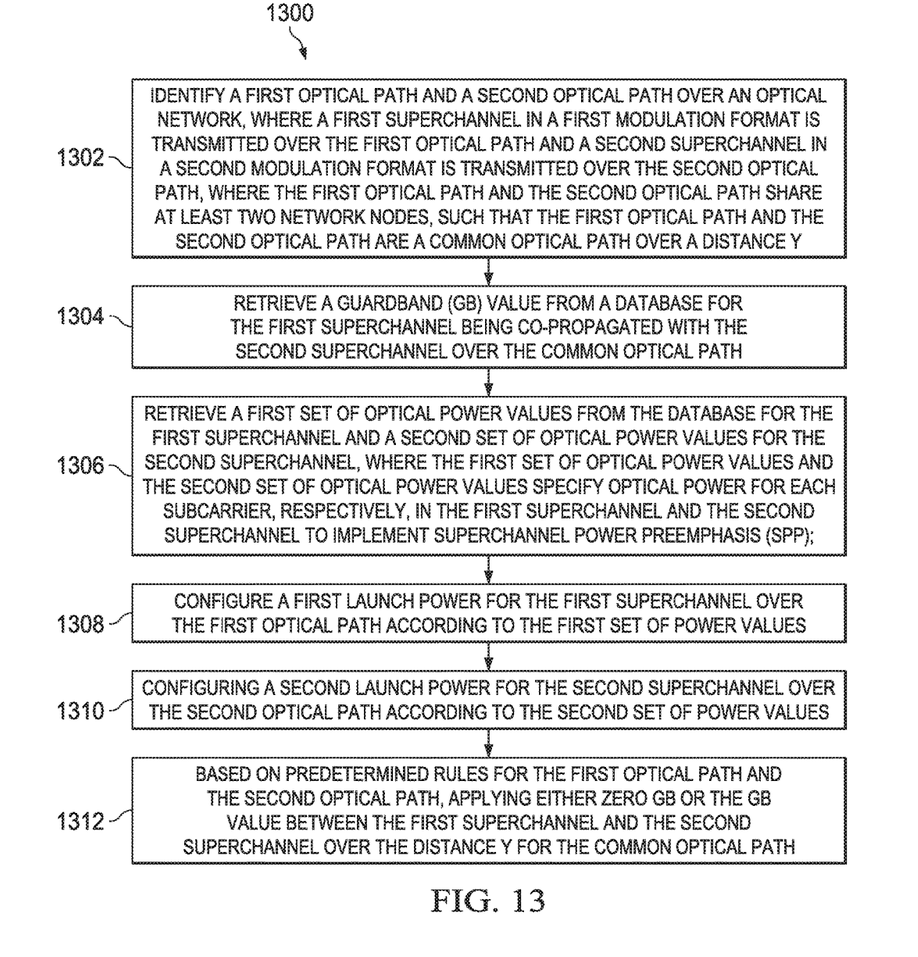
FIG. 13 is a flow chart of selected elements of a method for optimizing transmission of superchannels with different modulation formats.

Referring now to FIG. 13, a flowchart of selected elements of an embodiment of method 1300 for optimizing transmission of superchannels with different modulation formats, as described herein, is depicted. Method 1300 may be performed using optical transport network 101 by network management system 300, which may communicate with various components in optical transport network 101, as described above. It is noted that certain operations described in method 1300 may be optional or may be rearranged in different embodiments. Method 1300 may retrieve certain pre-calculated values from the database referenced in method 1200 above (see FIG. 12).

Method 1300 may begin at step 1302 by identifying a first optical path and a second optical path over an optical network, where a first superchannel in a first modulation format is transmitted over the first optical path and a second superchannel in a second modulation format is transmitted over the second optical path, where the first optical path and the second optical path share at least two network nodes, such that the first optical path and the second optical path are a common optical path over a distance Y. In step 1302, the first modulation format may be a lower order modulation format having a greater propagation distance than the second modulation format, which may be a higher order modulation format. At step 1304, a guardband (GB) value is retrieved from a database for the first superchannel being co-propagated with the second superchannel over the common optical path. At step 1306, a first set of optical power values is retrieved from the database for the first superchannel and a second set of optical power values is retrieved for the second superchannel, where the first set of optical power values and the second set of optical power values specify optical power for each subcarrier, respectively, in the first superchannel and the second superchannel to implement superchannel power pre-emphasis (SPP). At step 1308, a first launch power for the first superchannel over the first optical path is configured according to the first set of power values. The first launch power may be configured at an appropriate transmitter for the first optical path, such as at a universal transceiver. At step 1310, a second launch power for the second superchannel over the second optical path is configured according to the second set of power values. The second launch power may be configured at an appropriate transmitter for the second optical path, such as at a universal transceiver. Based on predetermined rules for the first optical path and the second optical path, at step 1312, either zero GB or the GB value is applied between the first superchannel and the second superchannel over the distance Y for the common optical path.

In particular, the predetermined rules in step 1312 may define whether a GB is used between the first superchannel and the second superchannel. When the first optical path and the second optical path co-propagate at a begin or an end of at least one of the first optical path and the second optical path, the predetermined rules may specify setting a GB between the first superchannel and the second superchannel to zero when the distance Y is less than a threshold distance, and setting the GB to the GB value when the distance Y is greater than or equal to the threshold distance. In various embodiments, the threshold distance may be 900 km, or 1,000 km, or 1,100 km, or 1,500 km, or 500 km, or 750 km, among other example values. When the first optical path and the second optical path do not co-propagate at a begin or an end of at least one of the first optical path and the second optical path, such that the second optical path spans the distance Y, and the first optical path spans a distance X that is greater than the distance Y, the predetermined rules may further specify setting a GB between the first superchannel and the second superchannel to zero when the second optical path starts at less than a distance Z from the begin of the first optical path, the distance Z given by (X−Y)/2, and setting the GB to the GB value when the second optical path starts greater than or equal to the distance Z from the begin of the first optical path.

As disclosed herein, methods and systems for optimizing the transmission of superchannels with different modulation formats may include pre-calculating different guardband (GB) values between superchannels and sets of power values for subcarriers to implement subcarrier power pre-emphasis (SPP). When a request for an optical path is received at a network management system, the spectral allocation of each superchannel, including a GB, is determined according to pre-specified rules based on co-propagation of the superchannels with different modulation formats.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for transmitting superchannels with different modulation formats, the method comprising:
   identifying a first optical path and a second optical path over an optical network, wherein a first superchannel in a first modulation format is transmitted over the first optical path and a second superchannel in a second modulation format is transmitted over the second optical path, wherein the first optical path and the second optical path share at least two network nodes, such that the first optical path and the second optical path are a common optical path over a distance Y;
   retrieving a guardband (GB) value from a database for the first superchannel being co-propagated with the second superchannel over the common optical path;
   retrieving a first set of optical power values from the database for the first superchannel and a second set of optical power values for the second superchannel, wherein the first set of optical power values and the second set of optical power values specify optical power for each subcarrier, respectively, in the first superchannel and the second superchannel to implement superchannel power pre-emphasis (SPP);
   configuring a first launch power for the first superchannel over the first optical path according to the first set of power values;
   configuring a second launch power for the second superchannel over the second optical path according to the second set of power values; and
   based on predetermined rules for the first optical path and the second optical path, applying either zero GB or the GB value between the first superchannel and the second superchannel over the distance Y for the common optical path.

2. The method of claim 1, further comprising:
   pre-calculating the GB value for different types of superchannels, respectively, and storing the GB values in the database; and
   pre-calculating a set of power values corresponding to each subcarrier for different superchannels, respectively, and storing the sets of power values in the database,
   wherein the GB values and the sets of power values are indexed in the database for different modulation formats, different numbers of subcarriers, and different values for the distance Y.

3. The method of claim 1, wherein the first modulation format is a lower order modulation format having a greater propagation distance than the second modulation format, which is a higher order modulation format.

4. The method of claim 3, wherein the first modulation format is a QPSK format, and the second modulation format is an m-QAM format where m is greater than 4.

5. The method of claim 3, wherein the first modulation format and the second modulation format are dual-polarization (DP) modulation formats.

6. The method of claim 1, wherein the predetermined rules specify:
   when the first optical path and the second optical path co-propagate at a begin or an end of at least one of the first optical path and the second optical path,
   setting a GB between the first superchannel and the second superchannel to zero when the distance Y is less than a threshold distance; and
   setting the GB to the GB value when the distance Y is greater than or equal to the threshold distance.

7. The method of claim 6, wherein the threshold distance is 900 km.

8. The method of claim 6, wherein the predetermined rules further specify:
   when the first optical path and the second optical path do not co-propagate at a begin or an end of at least one of the first optical path and the second optical path, wherein the second optical path spans the distance Y and the first optical path spans a distance X that is greater than the distance Y,
   setting a GB between the first superchannel and the second superchannel to zero when the second optical path starts at less than a distance Z from the begin of the first optical path, the distance Z given by (X−Y)/2; and
   setting the GB to the GB value when the second optical path starts greater than or equal to the distance Z from the begin of the first optical path.

9. A network management system for enabling transmission of superchannels with different modulation formats, the network management system comprising a processor configured to access non-transitory computer readable memory media storing instructions executable by the processor for:
identifying a first optical path and a second optical path over an optical network, wherein a first superchannel in a first modulation format is transmitted over the first optical path and a second superchannel in a second modulation format is transmitted over the second optical path, wherein the first optical path and the second optical path share at least two network nodes, such that the first optical path and the second optical path are a common optical path over a distance Y;
retrieving a guardband (GB) value from a database for the first superchannel being co-propagated with the second superchannel over the common optical path;
retrieving a first set of optical power values from the database for the first superchannel and a second set of optical power values for the second superchannel, wherein the first set of optical power values and the second set of optical power values specify optical power for each subcarrier, respectively, in the first superchannel and the second superchannel to implement superchannel power pre-emphasis (SPP);
configuring a first launch power for the first superchannel over the first optical path according to the first set of power values;
configuring a second launch power for the second superchannel over the second optical path according to the second set of power values; and
based on predetermined rules for the first optical path and the second optical path, applying either zero GB or the GB value between the first superchannel and the second superchannel over the distance Y for the common optical path.

10. The network management system of claim 9, further comprising the database and instructions for:
pre-calculating the GB value for different types of superchannels, respectively, and storing the GB values in the database; and
pre-calculating a set of power values corresponding to each subcarrier for different superchannels, respectively, and storing the sets of power values in the database,
wherein the GB values and the sets of power values are indexed in the database for different modulation formats, different numbers of subcarriers, and different values for the distance Y.

11. The network management system of claim 9, wherein the first modulation format is a lower order modulation format having a greater propagation distance than the second modulation format, which is a higher order modulation format.

12. The network management system of claim 11, wherein the first modulation format is a QPSK format, and the second modulation format is an m-QAM format where m is greater than 4.

13. The network management system of claim 11, wherein the first modulation format and the second modulation format are dual-polarization (DP) modulation formats.

14. The network management system of claim 9, wherein the predetermined rules specify:
when the first optical path and the second optical path co-propagate at a begin or an end of at least one of the first optical path and the second optical path,
setting a GB between the first superchannel and the second superchannel to zero when the distance Y is less than a threshold distance; and
setting the GB to the GB value when the distance Y is greater than or equal to the threshold distance.

15. The network management system of claim 14, wherein the threshold distance is 900 km.

16. The network management system of claim 14, wherein the predetermined rules further specify:
when the first optical path and the second optical path do not co-propagate at a begin or an end of at least one of the first optical path and the second optical path, wherein the second optical path spans the distance Y, and the first optical path spans a distance X that is greater than the distance Y,
setting the GB between the first superchannel and the second superchannel to zero when the second optical path starts at less than a distance Z from the begin of the first optical path, the distance Z given by (X−Y)/2; and
setting the GB to the GB value when the second optical path starts greater than or equal to the distance Z from the begin of the first optical path.

* * * * *